United States Patent [19]

Ulbing

[11] Patent Number: 4,854,189
[45] Date of Patent: Aug. 8, 1989

[54] ROTARY/LINEAR ACTUATOR
[75] Inventor: Otmar M. Ulbing, Fairport, N.Y.
[73] Assignee: Windwinder Corporation, Tipp City, Ohio
[21] Appl. No.: 92,955
[22] Filed: Sep. 4, 1987
[51] Int. Cl.⁴ ............................................. F16H 37/00
[52] U.S. Cl. ........................................ 74/640; 464/160
[58] Field of Search .................... 74/640; 464/77, 160

[56] References Cited

U.S. PATENT DOCUMENTS

| | | | |
|---|---|---|---|
| 465,869 | 12/1891 | MacLean | 464/160 |
| 2,276,195 | 3/1942 | Holmes | 137/139 |
| 2,882,428 | 4/1959 | Frisch | 310/83 |
| 2,893,276 | 7/1959 | Quackenbush | 77/34.4 |
| 2,906,143 | 9/1959 | Musser | 74/640 |
| 2,918,827 | 12/1959 | Brown | 74/424.8 |
| 2,943,465 | 7/1960 | Musser | 464/160 |
| 2,943,508 | 7/1960 | Musser | 74/424.8 |
| 2,979,964 | 4/1961 | Musser | 74/424.8 |
| 3,065,645 | 11/1962 | Musser | 74/127 |
| 3,077,792 | 2/1963 | Kinderman | 74/640 |
| 3,117,763 | 1/1964 | Musser | 251/165 |
| 3,147,631 | 9/1964 | Larsh | 74/89 |
| 3,159,758 | 12/1964 | Hemperly, Jr. et al. | 310/83 |
| 3,236,066 | 2/1966 | Webb | 464/77 |
| 3,356,874 | 12/1967 | Chiapparelli et al. | 310/83 |
| 3,374,372 | 3/1968 | Tinder et al. | 310/80 |
| 3,415,144 | 12/1968 | Carson | 74/640 |
| 3,495,108 | 2/1970 | Van Buskirk | 310/68 |
| 3,512,421 | 5/1970 | Anderson | 74/89.15 |
| 3,548,227 | 12/1970 | Woodward | 310/83 |
| 3,730,016 | 5/1973 | Miller | 74/424.8 B |
| 3,851,499 | 12/1974 | Noguchi | 64/275 |
| 3,895,288 | 7/1975 | Lampen et al. | 323/94 R |
| 4,041,795 | 8/1977 | Rekoff, Jr. | 74/424.8 B |
| 4,482,828 | 11/1984 | Vergues et al. | 310/83 |
| 4,557,153 | 12/1985 | Ulbing | 74/2 |
| 4,719,816 | 1/1988 | Carlnäs | 74/625 |

FOREIGN PATENT DOCUMENTS

| | | | |
|---|---|---|---|
| 965022 | 8/1950 | France | 464/160 |
| 60-84440 | 5/1985 | Japan | 74/640 |

OTHER PUBLICATIONS

"7 Ways to Limit Shaft Rotation"; Abeles; *Mechanisms, Linkages, and Mechanical Control;* Edited by Chironis; 1965; pp. 272-273.

Primary Examiner—Leslie A. Braun
Assistant Examiner—Scott Anchell
Attorney, Agent, or Firm—Bean, Kauffman & Spencer

[57] ABSTRACT

There is disclosed a rotary/linear actuator, wherein a power driver rotary component imposes a strain wave upon a flexible sleeve member, which is flexed into screw engagement with a rotationally fixed member for purposes of imparting linear movement to the sleeve member. The extent of linear movement of the sleeve member is preferably controlled by a rotational limit control device associated with the rotary component.

19 Claims, 3 Drawing Sheets

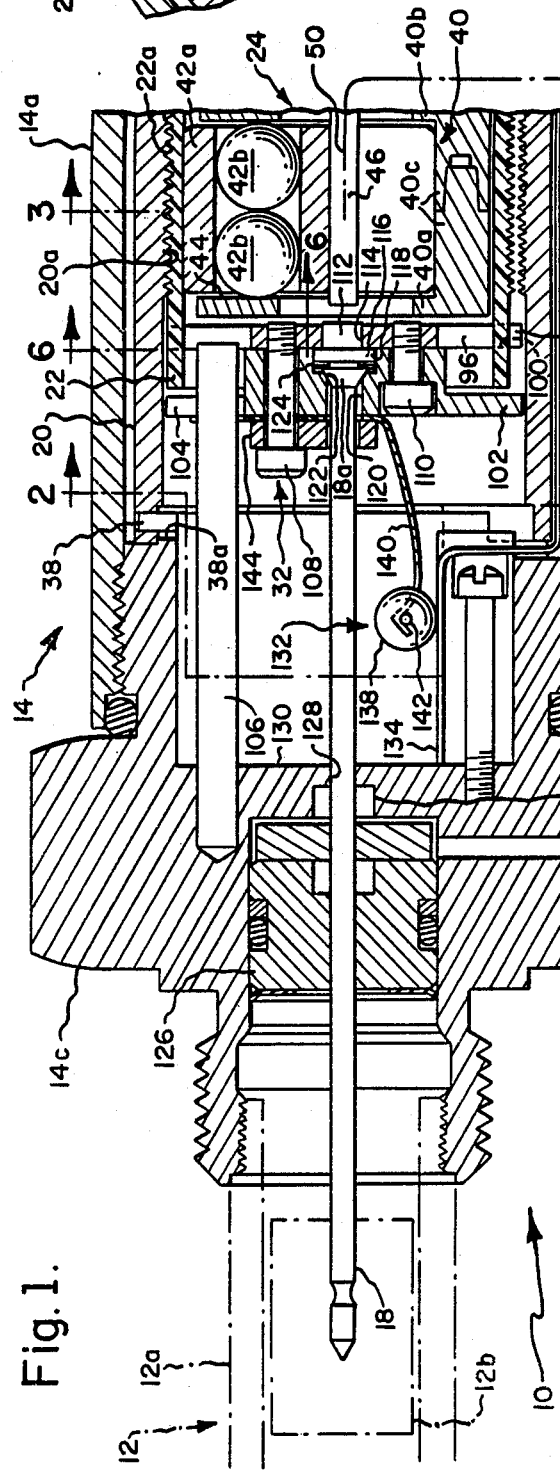
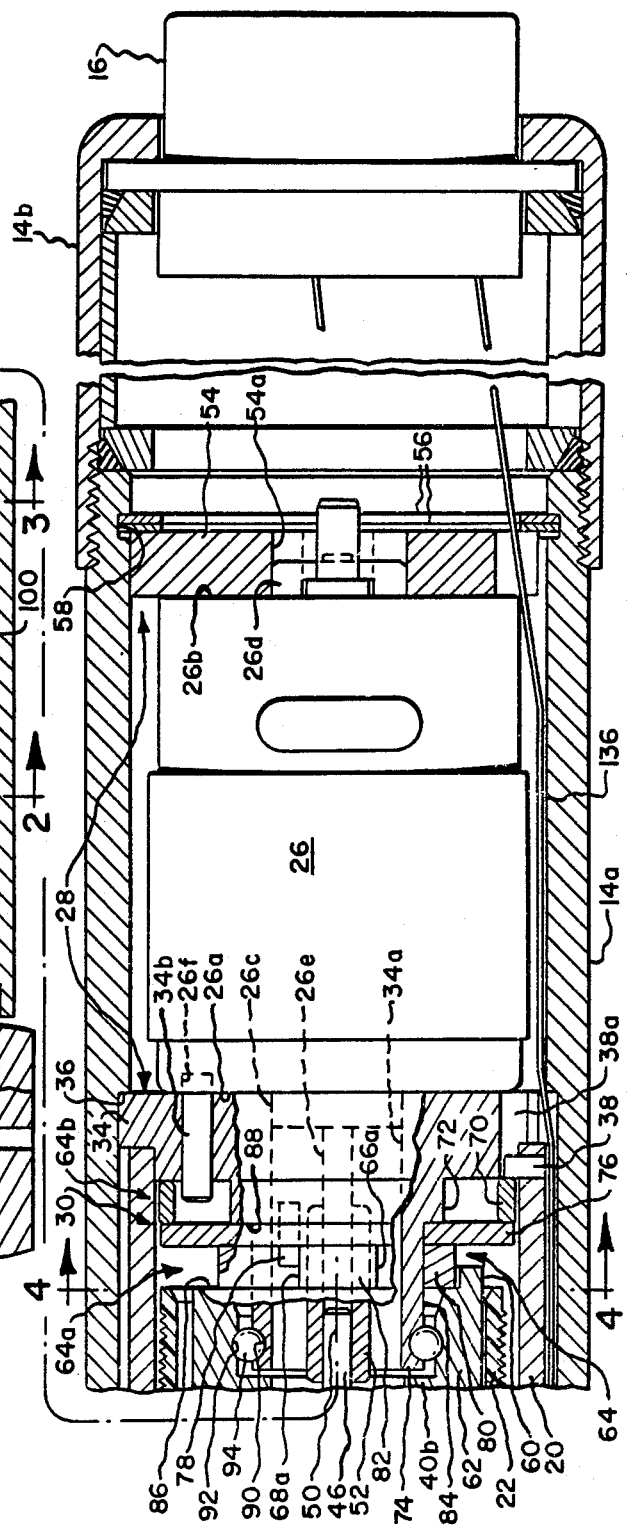
Fig. 1.
Fig. 6.

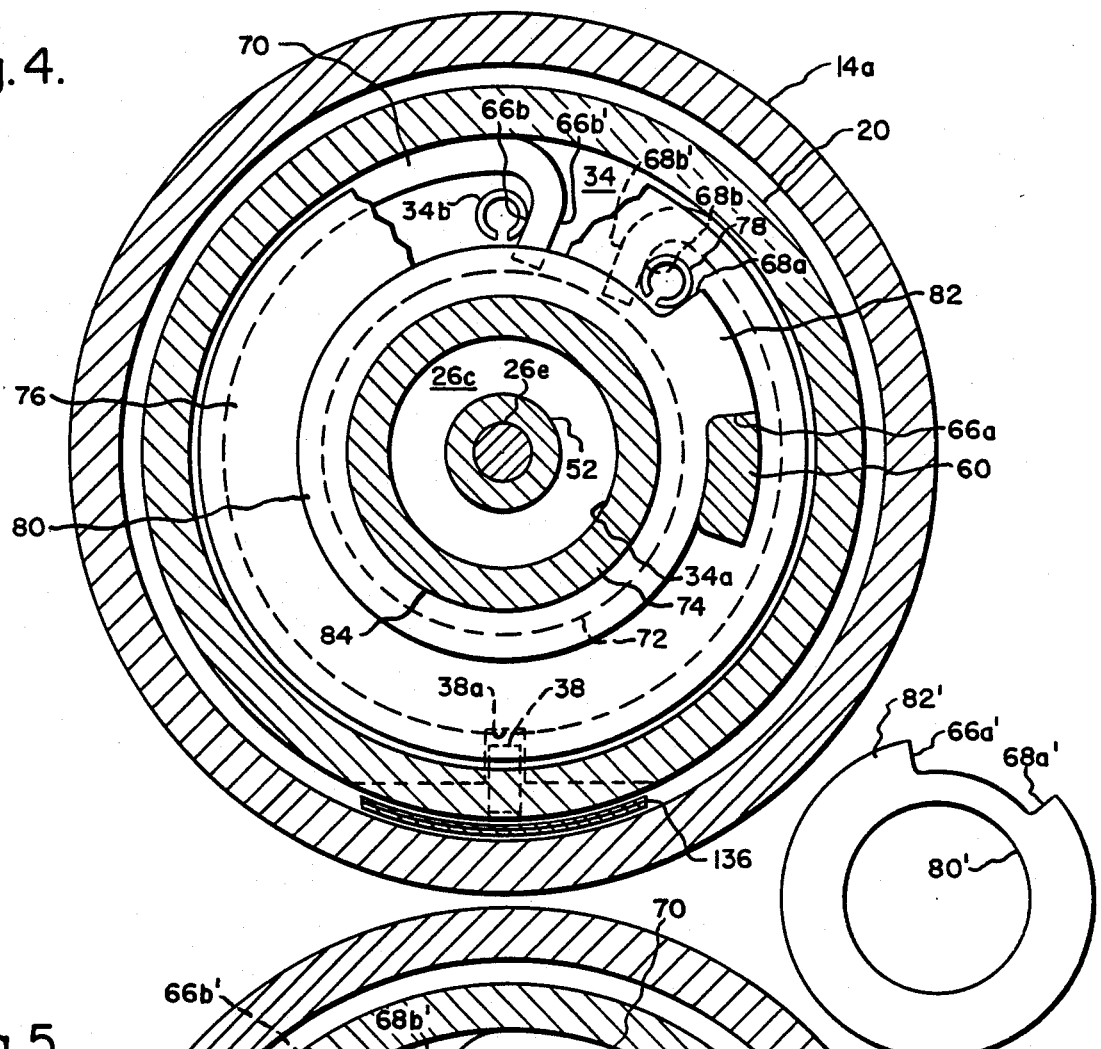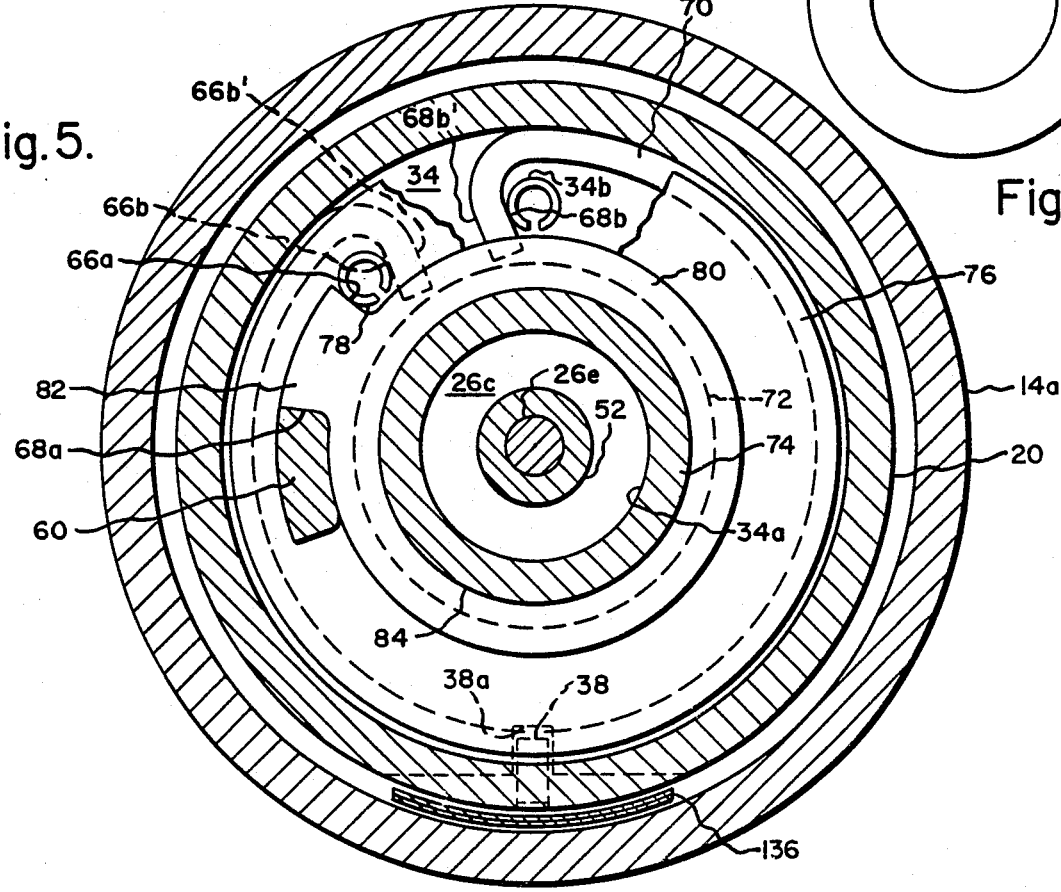

4,854,189

ROTARY/LINEAR ACTUATOR

BACKGROUND OF THE INVENTION

This invention generally relates to power transmission devices or actuators of the rotary-to-linear motion converting type. Such devices are widely used wherever a rotary power input, such as that furnished by an electric motor or the like, is desired to provide a linear output. This invention more particularly relates to "harmonic screw" actuators of the general type disclosed in my prior U.S. Pat. No. 4,557,153, wherein rotary motion of the power input component is converted into linear motion of the output component by means of a strain wave imposed upon a flexible sleeve member of the assembly. In this prior patent, the flexible sleeve is of a relatively thick wall construction and arranged to threadably engage with a sleeve forming an outer wall of the actuator, which is caused to undergo linear movement incident to rotary motion of the power input component.

SUMMARY OF THE INVENTION

The present invention is directed to a rotary/linear actuator, wherein a rotary component fixed against axial displacement serves to deform a rotatably fixed thin walled sleeve into threaded engagement with a rotatably and axially fixed outer sleeve, so as to impart axial movements to the flexible sleeve.

The actuator features means for controlling the extent of rotational movement of the rotary component in a manner serving to prevent transfer of inertia of the rotational components of the actuator to the flexible sleeve at the limits of its path of travel or at any point therealong at which it is desired to terminate movement of such flexible sleeve.

The actuator additionally features an improved arrangement for mounting a drive motor within the actuator and a fully enclosed potentiometer for providing a signal indicative of the position of the flexible sleeve along its path of travel.

BRIEF DESCRIPTION OF THE DRAWINGS

The nature and mode of operation of the present invention will now be more fully described in the following detailed description taken with the accompanying drawings wherein:

FIG. 1 is a sectional view of an actuator formed in accordance with a preferred form of the present invention;

FIG. 4 is a sectional view taken generally along the line 4—4 in FIG. 1;

FIG. 5 is a view similar to FIG. 4, but showing an opposite rotation limiting condition;

FIG. 6 is a sectional view taken generally along the line 6—6 in FIG. 1; and

FIG. 7 is a view illustrating an alternate stroke plate design.

DETAILED DESCRIPTION

Figure 2:
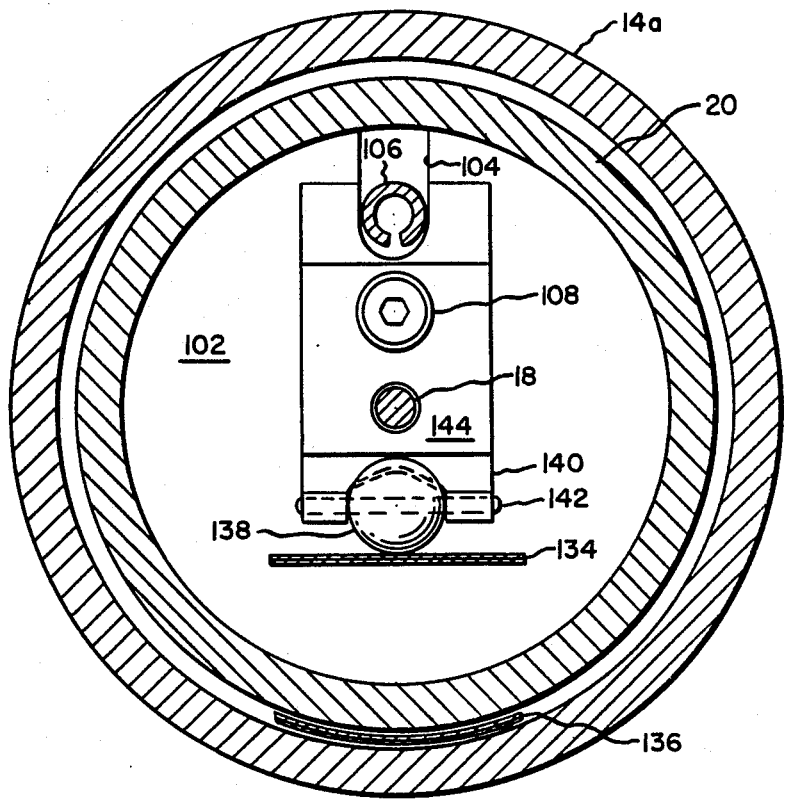
FIG. 2 is a sectional view taken generally along the line 2—2 in FIG. 1.

Reference is first made in FIG. 1, wherein a rotary/linear actuator formed in accordance with a preferred form of the present invention is generally designated as 10 and shown for purposes of illustration in association with an hydraulic spool type valve 12 generally depicted in broken line as including a ported valve casing 12a and valve spool 12b.

Actuator 10 generally includes a generally cylindrical housing or casing 14 having a central section 14a having its opposite ends threadably or otherwise suitably connected to a pair of end sections 14b and 14c; end section 14b being apertured to receive a plug 16 adapted to be connected to a suitable electrical source and readout device, not shown, and section 14c being apertured to allow a displacement actuator member, such as rod 18, to project outwardly of the housing for connection to a device, such as valve spool 12b, to be subjected to linear displacements under the control of actuator 10. In the illustrated construction, end section 14c is also adapted for attachment to valve casing 12a, so as to provide a closure for one end of the valve casing, and to a convenient support for actuator 10.

Acutator 10 additionally includes an outer sleeve 20 serving to define an internally screw threaded portion 20a; an inner sleeve 22, which serves to define an externally screw threaded portion 22a; rotary means 24 arranged inwardly of inner sleeve 22 in engagement with peripherally separate portions of its inner surface; an electrically powered motor 26 for effecting oppositely directed rotations of rotary means 24; means 28 for mounting motor 26 within housing 14; a movement control means 30 for controlling the extent or limits of rotational movement of rotary means 24; and means 32 for connecting inner sleeve 22 to rod 18 and constraining the inner sleeve against rotation relative to housing 14, while permitting reciprocation of the inner sleeve lengthwise of the housing.

In the illustrated construction, outer sleeve 20 is rigid and fixed against displacement lengthwise of housing 14 by being clamped intermediate end section 14c and a first mounting member 34, which in turn engages with an annular abutment surface 36 defined by central section 14a. Rotation of outer sleeve 20 relative to housing 14 and first mounting member 34, and thus rotation of such first mounting member relative to the housing, is constrained by providing opposite ends of the outer sleeve with keys in the form of a pair roll pins 38,38 received within keyways or slots 38a,38a formed in end section 14c and the first mounting member.

Inner sleeve 20 is preferably formed of a resiliently deformable material, such as a Nylon alloy having self-lubricating properties, and has a minimum wall thickness as required to provide for a maximum cycle life for any design loading condition. The degree of resiliency of the inner sleeve must necessarily be sufficient to permit radially directed deformations thereof as required for mating engagement of threaded portions 20a and 20a. On the other hand, the inner sleeve must possess sufficient rigidity in a direction extending axially thereof to resist crushing or buckling thereof under operational loading conditions, as the inner sleeve is linearly displaced for purposes of moving rod 18 in the manner to be described. In accordance with a presently preferred form of the invention, inner sleeve 22 is provided with a relatively short, non-threaded end section adapted for attachment to connecting and constraining means 32, and the axial length of threaded portion 22a is approximately equal to the distance through which rod 18 is to be displaced, plus the effective axial length of rotary means 24 disposed in engagement with the inner sleeve. Also, it is preferable that the outer diameter of the non-threaded end section of the inner sleeve be intermediate the diameter of the roots and crests of the threads forming the thread portion.

Figure 3:
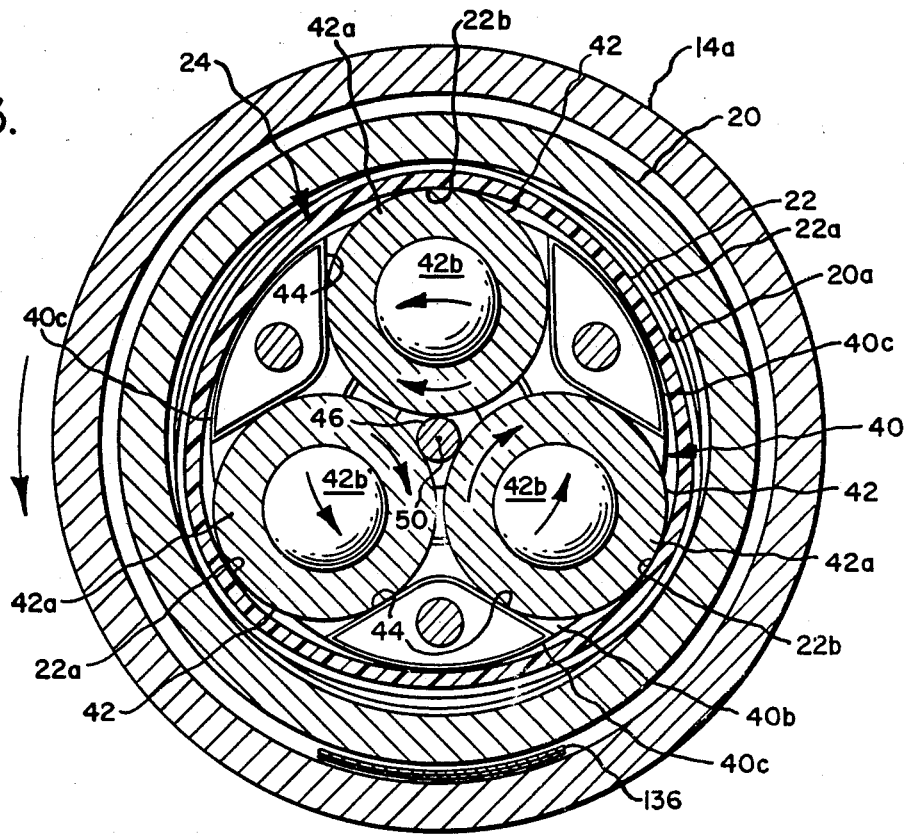
FIG. 3 is a sectional view taken generally along the line 3—3 in FIG. 1.

Rotary means 24 is shown in FIGS. 1 and 3 as including a cage 40 generally defined by a pair of ring-shaped end walls 40a and 40b interconnected to assume a parallel relationship by a plurality of connecting legs 40c; roller devices 42 received one within each of a plurality of radially opening recesses 44, which have their radially disposed inner ends arranged in communication and are defined by the end walls and connecting legs; and a roller device drive/supporting shaft 46 arranged to be freely received within the cage for frictional driving engagement with each of the roller devices. The elements of rotary means 24 are sized such that roller devices 42 project radially outwardly of cage 40 for engagement with peripherally separate portions 22b of the inner surface of inner sleeve 22 and serve to force radially aligned areas of externally screw threaded portion 22a to move outwardly to lie in threaded engagement with internally screw threaded portion 20a, as best shown in FIG. 3. In the presently preferred construction, roller devices 42 are three in number and disposed for rotation about uniformly annularly spaced axes disposed parallel to a rotational axis 50 of cage 40, which is arranged coincident with the axis of shaft 46. Also, in the present construction, roller devices 42 are defined by cylindrically shaped metal rollers 42a having pairs of balls 42b press fit therewithin and arranged to cooperate with facing surfaces of cage end walls 40a and 40b to form end bearing devices for the rollers, as best shown in FIG. 1.

Motor 26 is of generally cylindrical construction having first and second or opposite end surfaces 26a and 26b fitted with projecting bushings 26c and 26d serving to support a motor drive shaft 26e sized and arranged to project outwardly of the motor casing through bushing 26c for driving connection with shaft 46 via coupling sleeve 52. End surface 26a is additionally formed with a locating recess 26f.

Motor mounting means 28 is shown in FIG. 1 as including above mentioned first mounting member 34, which is arranged for engagement with motor first end surface 26a; a second mounting member 54, which is slidably supported by housing central section 14a and arranged for engagement with motor second end surface 26b; and spring means in the form of one or more split rings 56, which are snap fit received within a radially inwardly opening annular slot 58 defined by the housing central section and serve to bias the second mounting member towards the first mounting member for purposes of clamping the motor axially therebetween. Rotation of motor 26 relative to mounting members 34 and 54, and thus housing 14, about axis 50 is prevented by providing such mounting members with through openings 34a and 54a sized to slidably received bushings 26c and 26d, respectively, and by further providing the first mounting member with a locating projection in the form of a split pin 34b sized for slidable receipt within locating recess 26f.

Movement control means 30 is shown in FIGS. 1, 4 and 5 as including a driver in the form of a lug 60 arranged to project from an annular extension 62 formed integrally with cage end wall 40b in a direction extending relatively towards first mounting member 34; a rotary fixed abutment defined for example by an end of split pin 34b disposed remotely of motor 26; and a motion transmission means 64 having an inlet end 64a provided with annularly spaced first and second portions or surfaces 66a and 68a arranged for alternate driven engagement by lug 60 and an outlet end 64b provided with annularly spaced first and second portion or surfaces 66b and 68b arranged for alternate abutting engagement with split pin 34b. More specifically, motion transmission means 64 includes a generally C-shaped resiliently deformable first member or spring 70, which is rotatably supported by a portion of the inner cylindrical surface of outer sleeve 20 arranged radially outwardly of a clearance surface 72 defined by a stepped diameter extension 74 formed integrally with first mounting member 34 and has its opposite or free ends turned radially inwardly to define portions or surfaces 66b and 68b; a second member 76, which is in the form of a flat annular plate or ring and carries a second abutment in the form of a pin 78 projecting transversely in opposite directions therefrom; and a third member 80 in the form of a flat annular plate or ring having a radial projection or enlargement 82 serving to define first and second portions 66a and 68a. Second and third members 76 and 80 are rotatably supported by a cylindrical bearing surface 84, which is defined by first mounting member extension 74, and such members are positionally located lengthwise of axis 50 by sliding engagement with facing annular bearing surfaces 86 and 88 defined by cage end wall extension 62 and first mounting member extension 74, respectively. By referring to FIG. 1, it will be understood that the lengths of pins 34b and 78, as measured lengthwise of axis 50, is such as will permit adjacent ends of such pins to alternately engage with surfaces 66b and 68b, while providing a clearance between such adjacent ends to allow rotation of second member 76 relative to first mounting member 34 through an angle exceeding 360°. In like fashion, the lengths of pin 78 and lug 60 permit their adjacent ends to alternatively engage with surfaces 66a and 68a, while providing a clearance between such adjacent ends sufficient to permit rotation of lug 60 relative to second member 76 through an angle exceeding 360°.

FIG. 4 illustrates a first limiting position of motion control means 30, which is defined by engagement of lug 60 with surface 66a, surface 68a with pin 78, pin 78 with surface 68b and surface 66b with pin 34b. An opposite or second limiting position of motion control means 30 is shown in FIG. 5 as being defined by engagement of lug 60 with surface 68a, surface 66a with pin 78, pin 78 with surface 66b and surface 68b with pin 34b. by viewing FIGS. 4 and 5, it will be understood that movement of motion control means 30 from its first limiting position towards its second limiting position is initiated by clockwise directed rotational movement of lug 60 away from its initial position shown in FIG. 4, such rotational movement is succession placing the lug in engagement with surface 68a to initiate clockwise directed rotational movement of third member 80 to in turn place surface 66a in engagement with pin 78 to initiate clockwise directed rotational movement of second member 76 to in turn place pin 78 in engagement with surface 66b to initiate clockwise directed rotational movememt of first member 70 and to in turn place surface 68b in engagement with pin 34b for purpose of arresting further rotation of the lug in a clockwise direction. Upon engagement of surface 68b with pin 34b and of surface 66b with pin 34b coincident with the arrival of motion control means 30 in its second and first limiting positions, respectively, first member 70 is caused to undergo resilient deformation for purposes of cushioning or providing a resilient bumper for the motion control means. The degree of resilient deformation of member 70 may be suitably limited, such as by abutting engagement between facing end surfaces 66b' and 68b' of such member.

The construction illustrated in FIGS. 1, 4 and 5 allows rotations of lug 60 and thus cage 40 between limiting positions, which in turn allows for oppositely directed translations of inner sleeve 22, and thus rod 18. The stroke of inner sleeve 22 may be selectively reduced by providing a group of two or more third members 80, which differ one from another only in the annular spacing between surfaces 66a and 68a. In FIG. 7, primed numerals 66a' and 68a' designate surfaces corresponding to surfaces 66a and 68a, but which have a relatively reduced annular spacing therebetween due to the provisions of third member 80' with a projection 82' having a greater annular extend than projection 82.

Again referring to FIG. 1, it will be noted that first mounting member 34 additionally serves to support cage 40 for rotation about axis 50. Specifically, member extension 72 is formed with an annular recess 90, which opens outwardly through bearing surface 84, and cage wall extension 62 is formed with an annular inwardly opening recess 92, which cooperates with recess 90 to accommodate a plurality of ball or other suitable bearing devices 94.

Connecting and constraining means 32 is shown in FIGS. 1, 2 and 6 as including a connector plate 96, which is disposed to extend transversely of inner sleeve 22 and is provided at its opposite ends with pairs of lugs 98 and 98 sized to be slidably received within pairs of apertures 100 and 100 formed in the inner sleeve; and a guide plate 102, which is slidably supported by outer sleeve 20 and serves to secure rod 18 to the connector plate. Guide plate 102 is formed with a guide slot 104 arranged to cooperate with a guide pin 106 fixed to housing end section 14c in order to contrain the connector plate, and thus the inner sleeve, against rotation about axis 50, while permitting reciprocating movements thereof lengthwise of housing 14. Guide plate 102 may be suitably secured to connector plate 96, as by a pair of bolts 108 and 110. Preferably, rod 18 is properly positioned and connected to connector plate 102 by the arrangement shown in FIG. 1 as including a position control pin 112, which is slidably seated within a through opening 114 formed in connector plate 102 and has an enlarged head 116 slidably received within an enlarged diameter bore opening 118 axially aligned and communicating with a reduced diameter bore opening 120 formed in guide plate 102 and sized to freely receive rod 18; a frusto-conical mounting portion 18a, which is formed integrally with an inner end of rod 18 and arranged to seat against an inwardly facing frusto-conical bearing surface 122 joining bore openings 118 and 120; and one or more Belleville washers 124 arranged within bore opening 118 intermediate enlarged head 116 and mounting portion 18a. The arrangement is such that tightening of bolts 108 and 110 places bearing surface 122 in engagement with mounting portion 18a and then serves to clamp Belleville washers 124 intermediate such mounting portion and enlarged head 116; the Belleville washers slightly deforming as required to compensate for manufacturing tolerances in the axial or lengthwise dimensions of bore opening 118, enlarged head 116 and mounting portion 18a and serving to thereafter cushion rod 18 against axially applied loads.

In the illustrated construction, the outer end of rod 18 is supported by a fluid sealing piston 126 slidably supported by housing end section 14c. When actuator 10 is used in other environments, so as to avoid inclusion of piston 126, the outer end of rod 18 may be slidably supported within a guide opening 128 defined by housing end section end wall 130.

In accordance with a presently preferred construction, actuator 10 is provided with a touch controlled potentiometer 132, which serves to provide an output signal indicative of the axial position of rod 18 relative to housing 14. Potentiometer 132 includes a control element or section 134, which is disposed parallel to axis 50 and is comprised of coextensive, elongated resistant and conductive members, not shown, which are normally disposed in a spaced relationship, but adapted to be moved into engagement by a force applied at any point along their lengths to provide a voltage gradient indicative of the position of such point; an electrical cable section 136 for coupling the control element to plug 16; and a force applying element preferably in the form of a roller 138 coupled to a mounting arm 140 via a pin or axle 142. Roller 138 is disposed in bearing or force applying engagement with control element 134 and coupled to rod 18 for displacement lengthwise of the control element by attaching arm 140 to guide plate 102 by means of bolt 108 and a clamping block 144. It will be understood that any suitable means may be coupled to plug 16 for purposes of applying a desired voltage to control element 134 and measuring the voltage gradient resulting from contact of roller 138 therewith, so as to provide a suitable signal indicative of the position of the roller and thus rod 18. Reference may be made to U.S. Pat. No. 3,895,288 for a disclosure of the construction of a touch actuated control element and means for measuring a voltage gradient.

In describing the mode of operation of acutator 10, it will be assumed that rod 18 is initially disposed in its fully retracted position shown in FIG. 1, which is defined when movement control means 30 is in its second limiting position shown in FIG. 5. Upon energization of motor 26, drive shaft 26e and thus shaft 46, is driven in a counterclockwise direction, as viewed in FIG. 5, whereby to effect clockwise directed rotational movement of roller devices 42 relative to cage 40, as viewed in FIG. 3. Clockwise directed rotational movement of roller devices 42, while in deforming engagement with the rotationally fixed inner sleeve 22, causes the roller devices to roll annularly of the inner sleeve such that cage 40 rotates and the points of engagement between threaded portions 20a and 22a move in a counterclockwise direction, as viewed in FIG. 3. As the points of engagement between threaded portions 20a and 22a move in a counterclockwise direction, inner sleeve 22 is displaced axially relative to axially and rotatably stationary or fixed outer sleeve 20, and as a result rod 18 forced to move outwardly of housing 14. Axial displacement of inner sleeve 22 and rod 18 continues until lug 60 drives first member surface 66b into engagement with abutment pin 34b to define the first limiting position of movement control means 30 shown in FIG. 4, whereupon counterclockwise directed rotation of cage 40 is arrested. With cage 40 held stationary by motion control means 30, motor 26 will normally stall if a rated load remains applied to rod 18, but if rod 18 is not subjected to loading at this point in time, shafts 26e and 46 may continue to rotate in which case roller devices 42 will simply rotate and slide relative to stationary or fixed points on the inner surface of inner sleeve 22 and no axial load will be applied to threaded portions 20a and 22a. If desired, motor 26 may be manually deenergized or automatically deenergized such as for example by making its control circuit responsive to rod stroke limit positions sensed by potentiometer 132. Rod 18 may be returned to its initial position by reversing motor 26, whereupon shafts 26e and 46, roller devices 42 and cage 40 are driven in opposite directions from those previously described until movement control means is returned to its second limiting position and rotation of cage 40 is again arrested. If desired, movement of rod 18 may be arrested in any position intermediate the opposite ends of its stroke, i.e. its fully retracted and extended positions, by simply deenergizing motor 26, and any such position may be easily determined by use of a rod position indicating signal generated by potentiometer 132. The utilization of movement control means 30 to define the limits of displacement of rod 18, as opposed to relying on an abutment(s) arranged for engagement with the rod or inner sleeve 22, is a particularly desirable feature of the invention, since it serves to absorb the rotational inertia of the components of the actuator without overloading or causing damage to inner sleeve threaded portion 22a.

In the illustrated construction, it is preferable that the as-formed outside diameter of inner sleeve 22 is slightly greater than the inside diameter of outer sleeve 20, such that a minimum degree of flexing of the inner sleeve is required to effect driving engagement between threaded portion 20a and 22a with a view to maximizing operational life of the inner sleeve. However, the outside diameter of inner sleeve 22 must be sufficiently small to insure that thread portion 22a is removed from engagement with thread portion 20a intermediate roller devices 42 in the manner depicted in FIG. 3. In the event that it is desired to modify actuator 10 to provide same with a "fail-safe" characteristic, as disclosed in U.S. Pat. No. 4,557,153, it would of course be necessary to provide inner sleeve 22 with an outside diameter, which is less than the inside diameter of outer sleeve 20, in order to permit uncoupling of the sleeve.

It is contemplated that various changes can be made in the illustrated construction including, as by way of example, forming the outer sleeve as an integral part of the actuator housing. Also, if required, the outer sleeve may be supported for power driven rotary movement relative to the actuator housing for purposes of providing for adjustments and/or rapid movements of the inner sleeve for various purposes, so long as means are also provided to selectively lock or constrain the outer sleeve against rotation, when it is desired to permit normal operation of the actuator in the manner previously described.

What is claimed is:

1. A rotary/linear actuator comprising in combination:
    a resiliently deformable inner sleeve having an externally screw threaded portion;
    means for constraining said inner sleeve against rotary movement;
    an outer sleeve having an internally screw threaded portion;
    means for constraining said outer sleeve against rotary and linear movement;
    rotary means arranged inwardly of said inner sleeve for engagement with an inner surface thereof for resiliently deforming peripherally separate portions of said externally screw threaded portion into engagement with said internally screw threaded portion, whereby upon rotation of said rotary means relative to said inner sleeve, said inner sleeve is linearly displaced relative to said outer sleeve, said rotary means having an effective axial length thereof disposed in engagement with said inner sleeve, said externally screw threaded portion having a length as measured axially of said inner sleeve approximately equal to said effective axial length plus the desired extent of linear displacement of said inner sleeve; and
    means for constraining said rotary means against linear movement relative to said outer sleeve.

2. An actuator according to claim 1, wherein movement control means are provided to control the extent of rotational movement of said rotary means for thereby controlling the extent of linear displacement of said inner sleeve, said movement control means includes a driver carried for rotation by said rotary means; a rotationally fixed abutment; and motion transmission means freely supported for rotational movement relative to said driver and said abutment, said motion transmission means including an inlet end having annularly spaced first and second portions arranged for alternate driven engagement by said driver and an outlet end having annularly spaced first and second portions arranged for alternate abutting engagement with said abutment, said first portions upon engagement thereof with said driver and said abutment defining a limit of rotational movement of said rotary means in one direction and said second portions upon engagement thereof with said driver and said abutment defining a limit of rotational movement of said rotary means in an opposite direction, and said transmission means includes a spring device for coupling said inlet and outlet ends thereof.

3. An actuator according to claim 1, wherein said means for constraining said inner sleeve includes means fixed to and extending transversely of one end of said inner sleeve and stationary guide means arranged to extend in alignment with the direction of linear displacement of said inner sleeve relative to said outer sleeve and for slidable engagement with said means fixed to said inner sleeve.

4. An actuator according to claim 3, wherein an actuator rod is fixed for movement with said means fixed to said one end of said inner sleeve in alignment with the direction of linear displacement of said inner sleeve, a touch controlled potentiometer is positionally fixed relative to said outer sleeve to extend generally parallel with said actuator rod and force applying means is carried by said means fixed to said one end of said inner sleeve for engagement with said potentiometer to indicate the extent of linear displacement of said actuator rod.

5. An actuator according to claim 3, wherein said one end of said inner sleeve is non-threaded, has an outer diameter intermediate the diameters of roots and crests of said externally screw threaded portion and is provided with radially opening apertures; and said means fixed to said inner sleeve is a plate having end portions received within said apertures.

6. An actuator according to claim 5, wherein an actuator rod is fixed to said plate in alignment with the direction of linear movement of said inner sleeve, a touch controlled potentiometer is positionally fixed relative to said outer sleeve to extend generally parallel with said actuator rod, and a force applying roller is carried by said plate for engagement with said potentiometer to indicate the extent of linear displacement of said actuator rod.

7. A rotary/linear actuator comprising in combination:
   a resiliently deformable inner sleeve having an externally screw threaded portion;
   means for constraining said inner sleeve against rotary movement;
   an outer sleeve having an internally screw threaded portion;
   means for constraining said outer sleeve against rotary and linear movement;
   rotary means arranged inwardly of said inner sleeve for engagement with an inner surface thereof for resiliently deforming peripherally separate portions of said externally screw threaded portion into engagement with said internally screw threaded portion, whereby upon rotation of said rotary means relative to said inner sleeve, said inner sleeve is linearly displaced relative to said outer sleeve;
   means for constraining said rotary means against linear movement; and movement control means for controlling the extent of rotational movement of said rotary means for thereby controlling the extent of linear displacement of said inner sleeve, said movement control means includes a driver carried for rotation by said rotary means, a rotationally fixed abutment, and motion transmission means freely supported for rotational movement relative to said driver and said abutment, said motion transmission means having an inlet end provided with annularly spaced first and second portions arranged for alternate driven engagement by said driver and an outlet end provided with annularly spaced first and second portions arranged for alternate abutting engagement with said abutment, and said transmission means includes a first freely rotatable, generally C-shaped resiliently deformable member having radially extending ends to define said first and second portions of said outlet end, a second freely rotatable member carrying a second abutment movable therewith for alternate engagement with said first and second portions of said outlet end, and a third freely rotatable member defining said first and second portions of said inlet end, and said first and second portions of said inlet end are arranged to alternately engage with said second abutment, wherein rotational movement of said rotary means in one direction is limited by simultaneous engagement of said first portions with said driver and said abutment, said second portion of said inlet end with said second abutment and said second abutment with said second portion of said outlet end, and rotational movement of said rotary means in an opposite direction is limited by simultaneous engagement of said second portions with said driver and said abutment, said first portion of said inlet end with said second abutment and said second abutment with said first portion of said outlet end.

8. An actuator according to claim 7, wherein said third freely rotatable member is one of a group of two or more members having differing annular spacing between said first and second portions of said inlet end for selectively varying the extent of rotational movement of said rotary means.

9. A rotary/linear actuator comprising in combination:
   an elongated actuator housing;
   a cage;
   means for mounting said cage within said housing for rotational movement about an axis extending lengthwise thereof and in a position fixed lengthwise of said axis;
   a plurality of roller means carried by said cage for rotation relative thereto about annularly spaced axes disposed parallel to said axis;
   motor means for effecting driven rotation of said roller means and said cage, said motor means has opposite end surfaces, one of said end surfaces having a bushing projecting therefrom for mounting a drive shaft of said motor means projecting outwardly through said bushing and a locating recess;
   means for mounting said motor means within said housing, said means for mounting said motor means includes a first mounting member peripherally fixed to said housing and arranged to engage with said one of said end surfaces, a second mounting member slidably supported by said housing and arranged to engage with the other of said end surfaces, and spring means or biasing said second mounting member towards said first mounting member to clamp said motor means therebetween, said first mounting member having a through opening for slidably receiving said bushing and a locating projection arranged for receipt within said locating recess and cooperating with said through opening to constrain said motor means against rotation relative to said housing;
   an annular internally screw threaded portion;
   means for mounting said internally screw threaded portion within said housing in a position disposed radially outwardly of said cage in which said internally screw threaded portion is contrained against rotational movement about and linear movement lengthwise of said axis;
   a resiliently deformable sleeve formed with an externally screw threaded portion, said roller means engaging an inner surface of said sleeve for resiliently deforming peripherally separate portions of said externally screw threaded portion into engagement with said internally screw threaded portion; and
   means for constraining said sleeve against rotational movement about said axis, whereby upon rotation of said roller means and said cage by said motor means, said sleeve is displaced lengthwise of said axis.

10. A rotary/linear actuator comprising in combination:
    an elongated actuator housing;
    a cage;
    means for mounting said cage within said housing for rotational movement about an axis extending lengthwise thereof and in a position fixed lengthwise of said axis, said means for mounting said cage includes an outwardly opening annular recess positionally fixed lengthwise of said axis, an inwardly opening annular recess defined by said cage and bearing means received within said annular recesses;

a plurality of roller means carried by said cage for rotation relative thereto about annularly spaced axes disposed parallel to said axis;

motor means for effecting driven rotation of said roller means and said cage;

means for mounting said motor means within said housing;

an annular internally screw threaded portion;

means for mounting said internally screw threaded portion within said housing in a position disposed radially outwardly of said cage in which said internally screw threaded portion is constrained against rotational movement about and linear movement lengthwise of said axis;

a resiliently deformable sleeve formed with an externally screw threaded portion, said roller means engaging an inner surface of said sleeve for resiliently deforming peripherally separate portions of said externally screw threaded portion into engagement with said internally screw threaded portion; and means for constraining said sleeve against rotational movement about said axis, whereby upon rotation of said roller means and said cage by said motor means, said sleeve is displaced lengthwise of said axis.

11. An actuator according to claim 10, wherein said first mounting member defines said outwardly opening recess.

12. A rotary/linear actuator comprising in combination:

an elongated actuator housing;

a cage;

means for mounting said cage within said housing for rotational movement about an axis extending lengthwise thereof and in a position fixed lengthwise of said axis;

a plurality of roller means carried by said cage for rotation relative thereto about annularly spaced axes disposed parallel to said axis;

motor means for effecting driven rotation of said roller means and said cage;

means for mounting said motor means within said housing;

an annular internally screw threaded portion;

means for mounting said internally screw threaded portion within said housing in a position disposed radially outwardly of said cage in which said internally screw threaded portion is constrained against rotational movement about and linear movement lengthwise of said axis;

a resiliently deformable sleeve formed with an externally screw threaded portion, said roller means engaging an inner surface of said sleeve for resiliently deforming peripherally separate portions of said externally screw threaded portion into engagement with said internally screw threaded portion; and means for constraining said sleeve against rotational movement about said axis, whereby upon rotation of said roller means and said cage by said motor means, said sleeve is displaced lengthwise of said axis, said means for constraining said sleeve includes a plate fixed to and disposed to extend transversely of said sleeve and guide means carried by said housing for constraining said plate for movement lengthwise of said axis, and an actuator rod projects from said housing in alignment with said axis and has an inner end thereof fixed to said plate for movement therewith.

13. An actuator according to claim 12, wherein said housing mounts a touch controlled potentiometer arranged to extend lengthwise of said axis, and said plate supports a roller arranged to move lengthwise of said axis in operative engagement with said potentiometer.

14. A rotary/linear actuator comprising in combination:

an elongated actuator housing;

a cage;

means for mounting said cage within said housing for rotational movement about an axis extending lengthwise thereof and in a position fixed lengthwise of said axis;

a plurality of roller means carried by said cage for rotation relative thereto about annularly spaced axes disposed parallel to said axis;

motor means for effecting driven rotation of said roller means and said cage;

means for mounting said motor means within said housing;

an annular internally screw threaded portion;

means for mounting said internally screw threaded portion within said housing in a position disposed radially outwardly of said cage in which said internally screw threaded portion is constrained against rotational movement about and linear movement lengthwise of said axis;

a resiliently deformable sleeve formed with an externally screw threaded portion, said roller means engaging an inner surface of said sleeve for resiliently deforming peripherally separated portions of said externally screw threaded portion into engagement with said internally screw threaded portion;

means for constraining said sleeve against rotational movement about said axis, whereby upon rotation of said roller means and said cage by said motor means, said sleeve is displaced lengthwise of said axis; and movement control means for controlling the extent of rotational movement of said cage for thereby controlling the extend of linear displacement of said sleeve, said movement control means including a driver carried by said cage, a rotationally fixed abutment carried by said housing, and motion transmission means freely supported for rotational movement relative to said driver and said abutment, said transmission means includes a first freely rotatable, generally C-shaped resiliently deformable member having radially extending ends to define annularly spaced first and second portions arranged for alternate abutting engagement with said abutment, a second freely rotatable member carrying a second abutment movable therewith for alternate engagement with said first and second portions of said deformable member, and a third freely rotatable member defining annularly spaced first and second portions arranged for alternate driven engagement by said driver, and said first and second portions of said third freely rotatable member are arranged to alternately engage with said second abutment, a limit of rotational movement of said cage in one direction being defined by simultaneous engagement of said first portions with said driver and said abutment, said second portion of said third freely rotatable member with said second abutment and said second abutment with said second portion of said deformable member and a limit of rotational movement of said cage in an opposite direction being defined by simultaneous engagement of said second portions with said driver and said abutment, said first portion of said third freely rotatable member with said second abutment and said second abutment with said first portion of said deformable member.

15. An actuator according to claim 14, wherein said abutment is carried by a first mounting member peripherally fixed to said housing, said first mounting member having an extension disposed concentrically of said axis, said abutment and said extension projecting from adjacent one surface of said first mounting member in a direction towards said cage; and said means for mounting said cage includes an outwardly opening annular recess defined by said cylindrical extension, an inwardly opening annular recess defined by said cage and bearing means received within said annular recesses, and said first, second and third freely rotatable members encircle said extension and are disposed concentrically of said axis.

16. An actuator according to claim 15, wherein said motor has opposite end surfaces, one of said end surfaces having a bushing projecting therefrom for mounting a drive shaft of said motor projecting outwardly through said bushing and a locating recess, said means for mounting said motor includes said first mounting member having a second surface facing in a direction opposite from said first surface thereof for engagement with said one of said end surfaces of said motor, a second mounting member slidably supported by said housing and arranged to engage with the other of said end surfaces of said motor, and spring means for biasing said second mounting member towards said first mounting member to clamp said motor therebetween, said first mounting member having a through opening extending between said first and second surfaces thereof and through said extension for slidably receiving said bushing and a projection arranged for receipt within said locating recess and cooperating with said through opening to constrain said motor against rotation relative to said housing.

17. A rotary/linear actuator comprising in combination:
an elongated actuator housing;
a cage;
means for mounting said cage within said housing for rotational movement about an axis extending lengthwise thereof and in a position fixed lengthwise of said axis;
a plurality of roller means carried by said cage for rotation relative thereto about annularly spaced axes disposed parallel to said axis;
motor means for effecting driven rotation of said roller means and said cage;
means for mounting said motor means within said housing;
an annular internally screw threaded portion;
means for mounting said internally screw threaded portion within said housing in a position disposed radially outwardly of said cage in which said internally screw threaded portion is constrained against rotational movement about and linear movement lengthwise of said axis;
a resiliently deformable sleeve formed with an externally screw threaded portion, said roller means engaging an inner surface of said sleeve for resiliently deforming peripherally separate portions of said externally screw threaded portion into engagement with said internally screw threaded portion; and
means for constraining said sleeve against rotational movement about said axis, whereby upon rotation of said roller means and said cage by said motor means, said sleeve is displaced lengthwise of said axis, said means for constraining said sleeve includes a plate fixed to and disposed to extend transversely of said sleeve and guide means carried by said housing for constraining said plate for linear movement along said axis, and said plate is fixed to said sleeve by projections extending from opposite ends thereof for slidable receipt within apertures opening transversely through said sleeve.

18. An actuator according to claim 17, wherein an actuator rod projects from said housing in alignment with said axis and has an inner end thereof fixed to said plate for movement therewith, and said housing mounts a touch controlled potentiometer arranged to extend lengthwise of said axis, and said plate supports a roller arranged to move lengthwise of said axis in operative engagement with said potentiometer.

19. A rotary/linear actuator comprising in combination:
a housing;
generally concentrically arranged inner and outer sleeves having externally and internally screw threaded portions, respectively, said inner sleeve is formed of resiliently deformable material;
rotary drive means arranged within said housing inwardly of said inner sleeve for engagement with an inner surface thereof for resiliently deforming peripherally separate portions of said externally screw threaded portion into engagement with said internally screw threaded portion, said drive means being rotatable about an axis extending lengthwise of said housing and said inner and outer sleeves;
means for constraining one of said inner and outer sleeves against both rotational movement and axial displacement thereof relative to said housing and for constraining the other of said inner and outer sleeves against rotation relative to said housing, while permitting axial displacement thereof relative to said housing along said axis; and
movement control means to control the extent of said axial displacement of said other of said inner and outer sleeves by controlling the extent of rotational movement of said rotary means, said movement control means including a driver carried for rotation with said rotary means, an abutment fixed with reference to said housing, and motion transmission means freely supported for rotational movement relative to said driver and said abutment about said axis, said transmission means includes a first freely rotatable, generally C-shaped resiliently deformable member having radially extending ends to define annularly spaced first and second portions arranged for alternate abutting engagement with said abutment, a second freely rotatable member carrying a second abutment movable therewith for alternate engagement with said first and second portions of said deformable member, and a third freely rotatable member defining annularly spaced first and second portions arranged for alternate driven engagement by said driver, and said first and second portions of said third freely rotatable member are arranged to alternately engage with said second abutment, a limit of rotational movement of said cage in one direction being defined by simultaneous engagement of said first portions with said driver and said abutment, said second portion of said third freely rotatable member with said second abutment and said second abutment with said second portion of said deformable means and a limit of rotational movement of said cage in an opposite direction being defined by simultaneous engagement of said second portions with said driver and said abutment, said first portion of said third freely rotatable member with said second abutment and said second abutment with said first portion of said deformable member.

* * * * *

UNITED STATES PATENT AND TRADEMARK OFFICE
CERTIFICATE OF CORRECTION

PATENT NO. : 4,854,189
DATED : August 8, 1989
INVENTOR(S) : Ulbing, Otmar M.

It is certified that error appears in the above-identified patent and that said Letters Patent is hereby corrected as shown below:

Col. 2, Line 55     "20a" should be --22a--

Col. 4, Line 54     "is" should be --in--

Col. 7, Line 42     "sleeve" should be --sleeves--

Col. 10, Line 27    "or" should be --for--

Col. 12, Line 43    "extend" should be --extent--

Signed and Sealed this

First Day of January, 1991

*Attest:*

HARRY F. MANBECK, JR.

*Attesting Officer*          Commissioner of Patents and Trademarks